(12) United States Patent
Oh

(10) Patent No.: US 12,709,091 B2
(45) Date of Patent: Aug. 18, 2026

(54) METHOD OF MANUFACTURING DISPLAY DEVICE AND WINDOW

(71) Applicant: Samsung Display Co., Ltd., Yongin-si (KR)

(72) Inventor: Young Eun Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 511 days.

(21) Appl. No.: 18/177,614

(22) Filed: Mar. 2, 2023

(65) Prior Publication Data

US 2023/0382097 A1 Nov. 30, 2023

(30) Foreign Application Priority Data

May 31, 2022 (KR) ........................ 10-2022-0067156

(51) Int. Cl.
*B32B 37/24* (2006.01)
*B32B 7/022* (2019.01)
(Continued)

(52) U.S. Cl.
CPC .............. *B32B 37/24* (2013.01); *B32B 7/022* (2019.01); *B32B 17/06* (2013.01); *B32B 38/00* (2013.01);
(Continued)

(58) Field of Classification Search
CPC .............. B32B 17/06; B32B 2037/243; B32B 2038/0064; B32B 2255/26; B32B 2305/74; B32B 2307/536; B32B 2310/0806; B32B 2315/08; B32B 2457/20; B32B 37/24; B32B 38/00; B32B 7/022; G02F 1/133331; Y10T 156/1052; Y10T 156/1057; Y10T 156/1059; Y10T 156/1082
See application file for complete search history.

(56) References Cited

U.S. PATENT DOCUMENTS

2004/0106707 A1* 6/2004 Su ........................ C09D 11/101 524/105
2004/0108808 A1* 6/2004 Kumagai ............ H10K 59/122 313/505
(Continued)

FOREIGN PATENT DOCUMENTS

JP 2018-016518 A 2/2018
KR 10-2017-0010955 A 2/2017
(Continued)

OTHER PUBLICATIONS

Translation JP-2018016518A, Ogura., Feb. 2018. (Year: 2018).*

*Primary Examiner* — Philip C Tucker
*Assistant Examiner* — Jimmy R Smith, Jr.
(74) *Attorney, Agent, or Firm* — Womble Bond Dickinson (US) LLP

(57) ABSTRACT

A method of manufacturing a display device includes preparing a window member including a first window including a display area, and a second window adjacent to a first side surface of the first window, forming a protective member on an upper surface of the window member by forming a preliminary protective layer on a first upper surface of the first window and on a second upper surface of the second window, and pre-curing the preliminary protective layer, and separating the second window from the first side surface.

15 Claims, 10 Drawing Sheets

(51) Int. Cl.
*B32B 17/06* (2006.01)
*B32B 38/00* (2006.01)

(52) U.S. Cl.
CPC . *B32B 2037/243* (2013.01); *B32B 2038/0064* (2013.01); *B32B 2255/26* (2013.01); *B32B 2305/74* (2013.01); *B32B 2307/536* (2013.01); *B32B 2310/0806* (2013.01); *B32B 2315/08* (2013.01); *B32B 2457/20* (2013.01)

(56) References Cited

U.S. PATENT DOCUMENTS

2016/0326051 A1* 11/2016 Kim ...................... C03C 21/002
2021/0380456 A1 12/2021 Visco et al.

FOREIGN PATENT DOCUMENTS

KR 10-2115197 B1 5/2020
KR 10-2020-0115092 A 10/2020
KR 10-2286402 B1 8/2021

* cited by examiner

FIG. 5
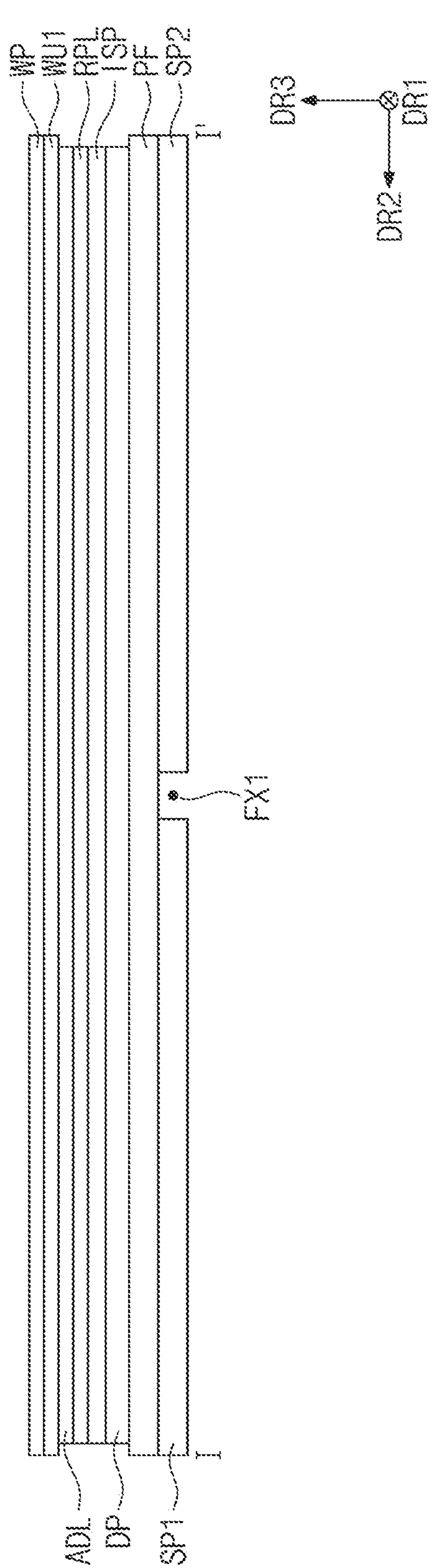

METHOD OF MANUFACTURING DISPLAY DEVICE AND WINDOW

CROSS-REFERENCE TO RELATED APPLICATION

This application claims priority to, and the benefit of, Korean Patent Application No. 10-2022-0067156, filed on May 31, 2022, in the Korean Intellectual Property Office, the contents of which are hereby incorporated by reference in its entirety.

BACKGROUND

1. Field

The present disclosure relates to a method of manufacturing a display device, which includes a window protective layer with a uniform thickness, and a window.

2. Description of the Related Art

Display devices that provide images to a user, such as a television set, a monitor, a smart phone, and a tablet computer, include a display panel to display the images. As the display panel, various display panels, such as a liquid crystal display panel, an organic light-emitting display panel, an electrowetting display panel, and an electrophoretic display panel, are being developed.

A window is suitable to have an impact resistance, such as surface hardness or strength, and to have a uniform and transparent surface to allow the user to view an input of the user or an output of the display device from the outside.

SUMMARY

The present disclosure provides a method of manufacturing a display device with improved reliability and durability.

The present disclosure also provides a method of manufacturing a window with impact resistance and uniform thickness.

Embodiments of the present disclosure provide a method of manufacturing a display device, the method including preparing a window member including a first window including a display area, and a second window adjacent to a first side surface of the first window, forming a protective member on an upper surface of the window member by forming a preliminary protective layer on a first upper surface of the first window and on a second upper surface of the second window, and pre-curing the preliminary protective layer, and separating the second window from the first side surface.

The first window may have a thickness that is substantially equal to a thickness of the second window.

The first window may have a hardness that is different from a hardness of the second window.

The second window may have a width between about 1 mm and about 8 mm in a direction away from the first side surface.

The window member may include a chemically tempered glass substrate.

The pre-curing of the preliminary protective layer may include light-curing the preliminary protective layer by a first light.

The preliminary protective layer may include polyimide, polycarbonate, polyamide, triacetyl cellulose, polymethylmethacrylate, or polyethylene terephthalate.

The separating of the second window from the first side surface may include removing a second protective portion on the second upper surface from a first protective portion on the first upper surface.

The separating of the second window from the first side surface may further include forming a third protective portion that is adjacent to the first protective portion and that does not overlap the first upper surface.

The method may further include curing a preliminary protective member including the first protective portion and the third protective portion.

The curing of the preliminary protective member may include light-curing the preliminary protective member by a second light.

The first protective portion may have a thickness that is equal to or greater than about 10 μm and that is equal to or less than about 80 μm after the curing of the preliminary protective member.

The method may further include polishing a second side surface of the first protective portion.

The method may further include polishing the third protective portion.

A hardness of the first side surface after the polishing of the second side surface may be substantially equal to a hardness of the first side surface in the preparing of the window member.

Embodiments of the present disclosure provide a method of manufacturing a display device, the method including preparing a first window on a carrier film, attaching a second window to the carrier film to be adjacent to a first side surface of the first window, forming a protective member on a first upper surface of the first window and on a second upper surface of the second window by forming a preliminary protective layer on the first upper surface of the first window and on the second upper surface of the second window, and pre-curing the preliminary protective layer, and separating the carrier film from a lower surface, and separating the second window from the first side surface of the first window.

The method may further include curing a preliminary protective member including a first protective portion on the first upper surface and a third protective portion that is adjacent to the first protective portion and that does not overlap the first upper surface.

The method may further include polishing a second side surface of the first protective portion.

The method may further include polishing the third protective portion.

Embodiments of the present disclosure provide a method of manufacturing a window, the method including preparing a window member including a first window including a transmission area, and a second window adjacent to a first side surface of the first window and separated from the first window, forming a protective member on an upper surface of the window member by forming a preliminary protective layer on a first upper surface of the first window and on a second upper surface of the second window, pre-curing the preliminary protective layer, and separating the second window from the first side surface.

According to the above, when a member to protect the window is formed, the process of forming the member is performed while a dummy window is being added to the window. Thus, the impact resistance of the window member, such as, the surface hardness and the strength, is improved, and the thickness of the window protective member becomes uniform. Accordingly, a reliability of the display device is improved.

BRIEF DESCRIPTION OF THE DRAWINGS

The above and other aspects of the present disclosure will become readily apparent by reference to the following detailed description when considered in conjunction with the accompanying drawings wherein:

FIG. 5 is a cross-sectional view of a display device according to one or more embodiments of the present disclosure;

DETAILED DESCRIPTION

Figure 1:
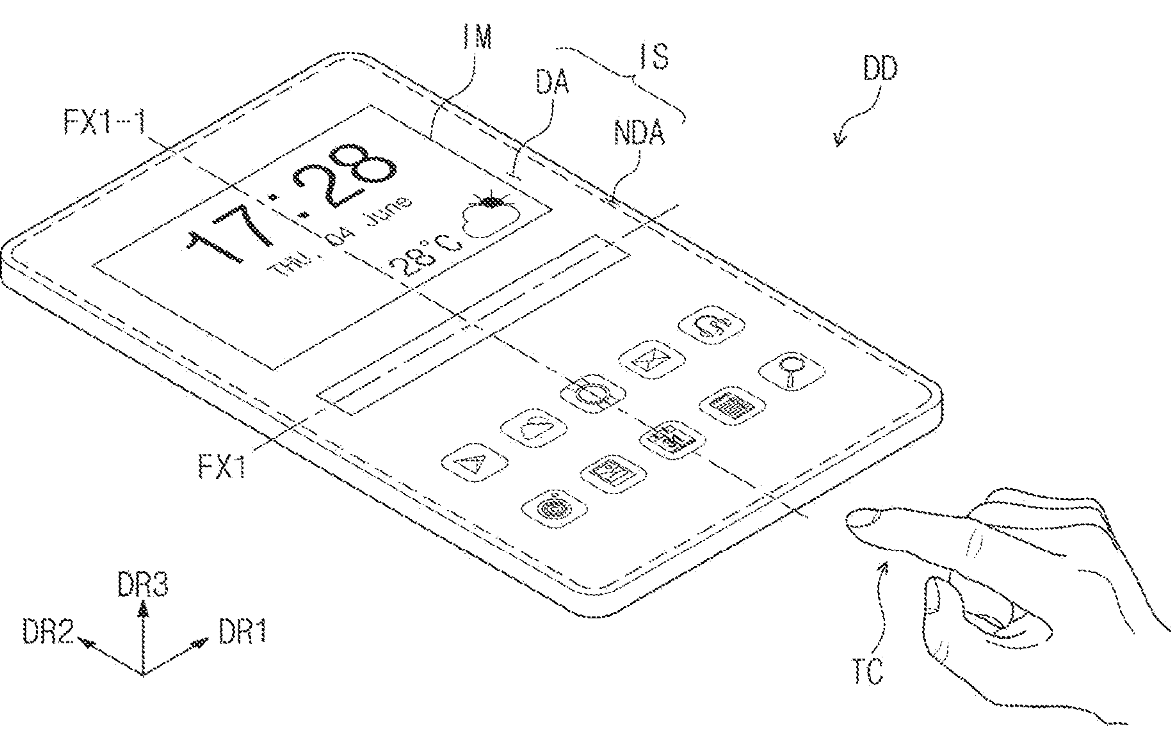
FIG. 1 is a perspective view of a display device according to one or more embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing, and the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a display device, a window included in the display device, and a method of manufacturing the window will be described with reference to accompanying drawings.

FIG. 1 is a perspective view of a display device DD according to one or more embodiments of the present disclosure.

Referring to FIG. 1, the display device DD has a rectangular shape with short sides extending in a first direction DR1, and long sides extending in a second direction DR2 crossing the first direction DR1. However, the shape of the display device DD should not be limited to the rectangular shape, and the display device DD may have a variety of shapes.

The display device DD may be a foldable display device. In detail, the display device DD according to one or more embodiments may be folded about folding axes FX1 and FX1-1 extending in respective directions (e.g., set or predetermined directions). Hereinafter, a state in which the display device DD is folded about the folding axes FX1 and FX1-1 is referred to as a folded state, and a state in which the display device DD is not folded is referred to as a non-folded state. The folding axes FX1 and FX1-1 may be rotational axes generated when the display device DD is folded, and the folding axes FX1 and FX1-1 may be formed by components and structures of the display device DD.

The folding axes FX1 and FX1-1 may extend in the first direction DR1 or the second direction DR2. In one or more embodiments of the present disclosure, the folding axis extending in the first direction DR1 is referred to as a first folding axis FX1, and the folding axis extending in the second direction DR2 is referred to as a second folding axis FX1-1. The display device DD may include one folding axis of the first and second folding axes FX1 and FX1-1. The display device DD may be folded about one of the first and second folding axes FX1 and FX1-1.

The display device DD according to the present disclosure may be applied to a large-sized electronic item, such as a television set and a monitor, and may be applied to a small-sized and medium-sized electronic items, such as a mobile phone, a tablet computer, a car navigation unit, and a game unit. These are merely examples, and thus, the display device DD may be applied to other electronic items as long as they do not depart from the present disclosure.

As shown in FIG. 1, the display device DD may display an image IM toward a third direction DR3 on a display surface IS that is substantially parallel to each of the first and second directions DR1 and DR2. The display surface IS on which the image IM is displayed may correspond to a front surface of the display device DD. Hereinafter, the third direction DR3 to which the image IM is displayed through the display surface IS may be referred to as a thickness direction of the display device DD and of each component included in the display device DD.

The display surface IS of the display device DD may be divided into a plurality of areas. The display surface IS of the display device DD may include a display area DA and a non-display area NDA, which are defined therein.

The display area DA may be an area on which the image IM is displayed, and a user may view the image IM through the display area DA. The display area DA may have a quadrangular shape. The non-display area NDA may surround the display area DA. Accordingly, the display area DA may have a shape defined by the non-display area NDA. However, this is merely an example, and the non-display area NDA may be located adjacent to only one side of the display area DA, or may be omitted, in one or more embodiments. The display device DD according to one or more embodiments of the present disclosure may include various embodiments, and it should not be limited to a particular embodiment.

The non-display area NDA may be an area adjacent to the display area DA, and the image IM may not be displayed through the non-display area NDA. The display device DD may include a bezel area defined by the non-display area NDA.

The display device DD according to the present disclosure may sense a user input TC applied thereto from the outside. The user input TC may include various forms of external inputs, such as a portion of the user's body, light, heat, or pressure. In one or more embodiments, the user input TC is shown as a user's hand applied to the front surface. However, this is merely an example, the user input TC may be provided in various forms as described above, the display device DD may sense the user input TC applied to a side or rear surface of the display device DD depending on a structure of the display device DD, and the present disclosure should not be limited to a particular embodiment.

The display device DD may activate the display surface IS to display the image IM while sensing the user input TC. In one or more embodiments, an area where the user input TC is sensed may be defined in the display area DA on which the image IM is displayed. However, this is merely an example, and the area where the user input TC is sensed may be defined in the non-display area NDA, or may be defined over the entire display surface IS.

Figure 2A:
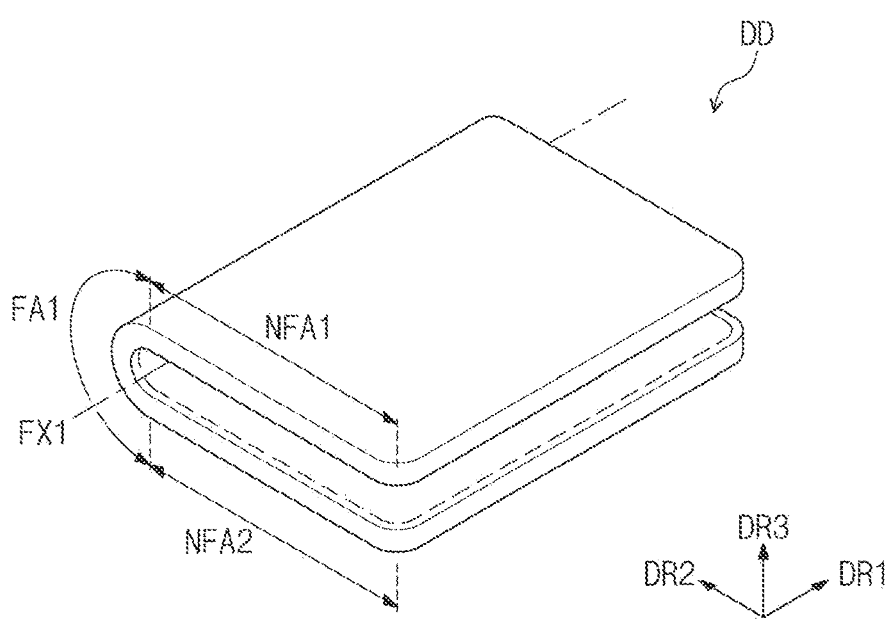
FIGS. 2A and 2B are perspective views of respective folded states of a display device according to one or more embodiments of the present disclosure.
Figure 2B:
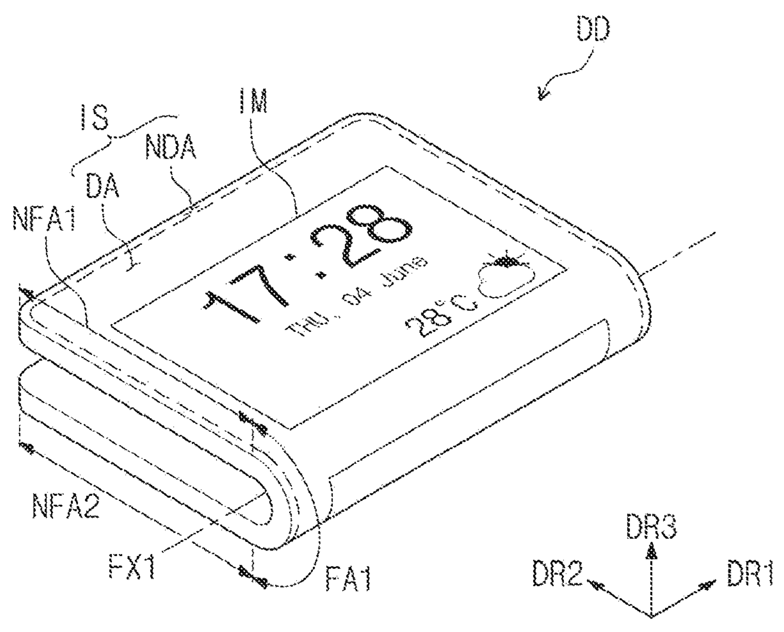

FIGS. 2A and 2B are perspective views of respective folded states of the display device DD according to one or more embodiments of the present disclosure. FIG. 2A is a perspective view showing a state in which the display device DD shown in FIG. 1 is inwardly folded (in-folding) about the first folding axis FX1, and FIG. 2B is a perspective view showing a state in which the display device DD shown in FIG. 1 is outwardly folded (out-folding) about the first folding axis FX1.

Referring to FIGS. 1, 2A and 2B, the display device DD may be the foldable display device. The display device DD may be folded about the folding axes, e.g., the first folding axis FX1 and the second folding axis FX1-1, extending in the respective directions (e.g., set or predetermined directions).

The display device DD may include a plurality of areas defined therein according to its operation mode. The areas may include a folding area FA1 and at least one non-folding area NFA1 and NFA2. The folding area FA1 may be defined between two non-folding areas NFA1 and NFA2.

The folding area FA1 may be folded about the first folding axis FX1 to form a curvature. The first folding axis FX1 may extend in the first direction DR1 (e.g., in a minor axis direction of the display device DD). The folding area FA1 may be folded about the first folding axis FX1, and may extend in the first direction DR1.

As an example, the non-folding areas NFA1 and NFA2 may include a first non-folding area NFA1 and a second non-folding area NFA2. The first non-folding area NFA1 may be located adjacent to one side of the folding area FA1 in the second direction DR2, and the second non-folding area NFA2 may be located adjacent to the other side of the folding area FA1 in the second direction DR2. The first non-folding area NFA1, the folding area FA1, and the second non-folding area NFA2 may be sequentially arranged in a direction opposite to the second direction DR2 (e.g., when the display device DD is unfolded).

The display device DD may be inwardly folded (in-folding) or outwardly folded (out-folding). In one or more embodiments, the in-folding indicates a state in which the display surface IS is folded to allow one portion thereof to face the other portion thereof, and the out-folding indicates a state in which the rear surface of the display device DD is folded to allow one portion thereof to face the other portion thereof. In other words, a folded state in which the display device is folded to allow display surfaces of different non-folding areas NFA1 and NFA2 to face each other may be defined as the in-folding, and a folded state in which the display device is folded to allow the display surfaces of different non-folding areas NFA1 and NFA2 to face the outside may be defined as the out-folding.

The display device DD shown in FIG. 2A may be inwardly folded (in-folding) to allow the display surface IS of the first non-folding area NFA1 to face the display surface IS of the second non-folding area NFA2. As the first non-folding area NFA1 rotates in a clockwise direction about the first folding axis FX1, the display device DD may be inwardly folded. The first folding axis FX1 may be defined at a center of the display device DD with respect to the second direction DR2 to inwardly fold the display device DD such that the first non-folding area NFA1 and the second non-folding area NFA2 may be aligned with each other.

Referring to FIG. 2B, the display device DD may be outwardly folded (out-folding) about the first folding axis FX1. The display device DD may display the image IM when the display surface of the first non-folding area NFA1 and the display surface of the second non-folding area NFA2 are exposed to the outside. Further, the image IM may also be displayed on the display surface of the folding area FA1 exposed to the outside. The display device DD may display the image IM while being in the non-folded state as shown in FIG. 1, and the display device DD may display the image IM while being in the out-folded state. The first non-folding area NFA1, the second non-folding area NFA2, and the folding area FA1 may respectively display images that provide independent information, or may respectively display portions of one image that provides one information.

The display device DD may be manufactured to have both the in-folded state and the out-folded state, or may be manufactured to have one of the in-folded and out-folded states.

Figure 3A:
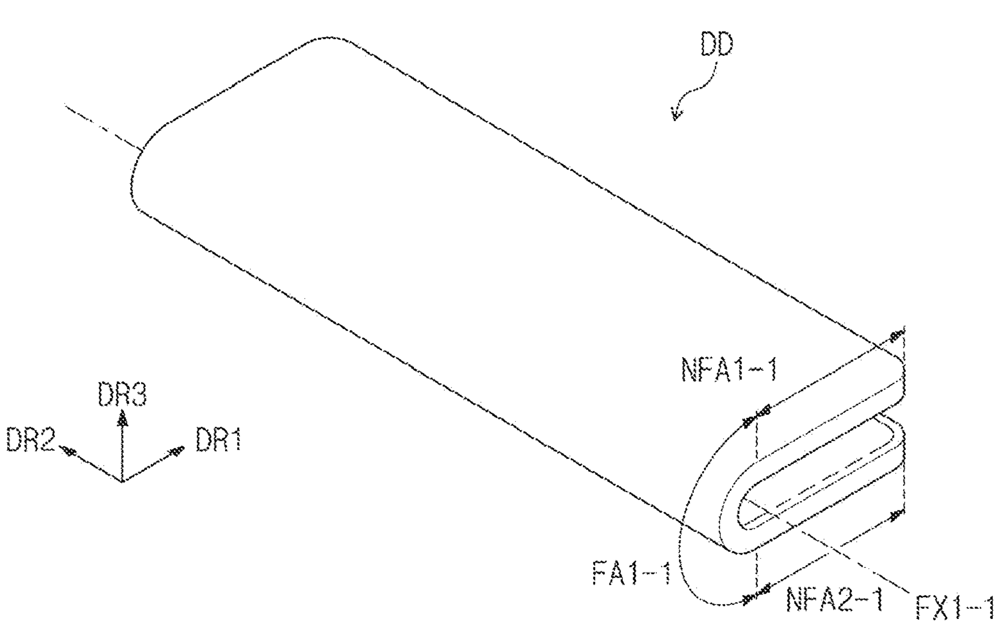
FIGS. 3A and 3B are perspective views of respective folded states of a display device according to one or more embodiments of the present disclosure.
Figure 3B:
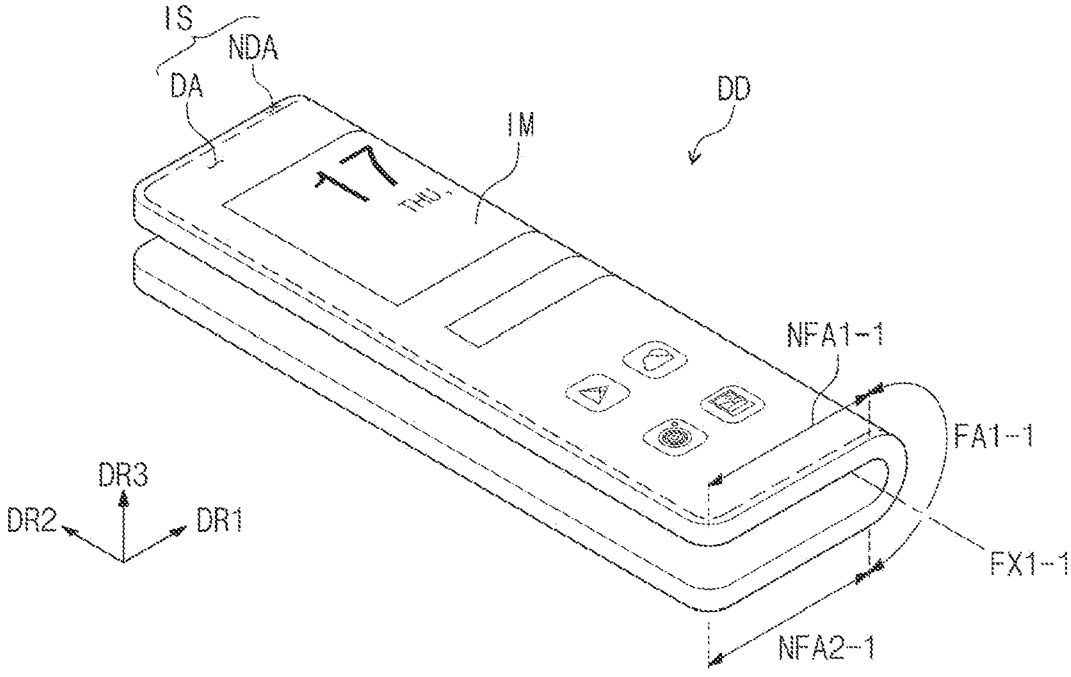

FIGS. 3A and 3B are perspective views of respective folded states of a display device DD according to one or more embodiments of the present disclosure. FIG. 3A is a perspective view showing a state in which the display device DD shown in FIG. 1 is inwardly folded (in-folding) about the second folding axis FX1-1, and FIG. 3B is a perspective view showing a state in which the display device DD shown in FIG. 1 is outwardly folded (out-folding) about the second folding axis FX1-1.

Referring to FIGS. 3A and 3B, the display device DD may be inwardly or outwardly folded about the second folding axis FX1-1. The second folding axis FX1-1 may extend in the second direction DR2 (e.g., a major axis direction of the display device DD).

The display device DD may include a plurality of areas defined therein according to its operation mode. The areas may include a folding area FA1-1 and at least one non-folding area NFA1-1 and NFA2-1. The folding area FA1-1 may be defined between two non-folding areas NFA1-1 and NFA2-1.

The folding area FA1-1 may be folded about the second folding axis FX1-1 to form a curvature. The folding area FA1-1 may be folded about the second folding axis FX1-1 and may extend in the second direction DR2.

As an example, the non-folding areas NFA1-1 and NFA2-1 may include a third non-folding area NFA1-1 and a fourth non-folding area NFA2-1. The third non-folding area NFA1-1 may be located adjacent to one side of the folding area FA1-1 with respect to the first direction DR1, and the fourth non-folding area NFA2-1 may be located adjacent to the other side of the folding area FA1-1 in the first direction DR1.

In one or more embodiments, one folding area FA1 or FA1-1 is defined in the display device DD, however, the present disclosure should not be limited thereto or thereby. According to one or more embodiments of the present disclosure, a plurality of folding areas may be defined in the display device DD. In the case where the plural folding areas are defined in the display device DD, each of the folding areas may be inwardly or outwardly folded about a folding axis defined to overlap each of the folding areas.

Figure 4:
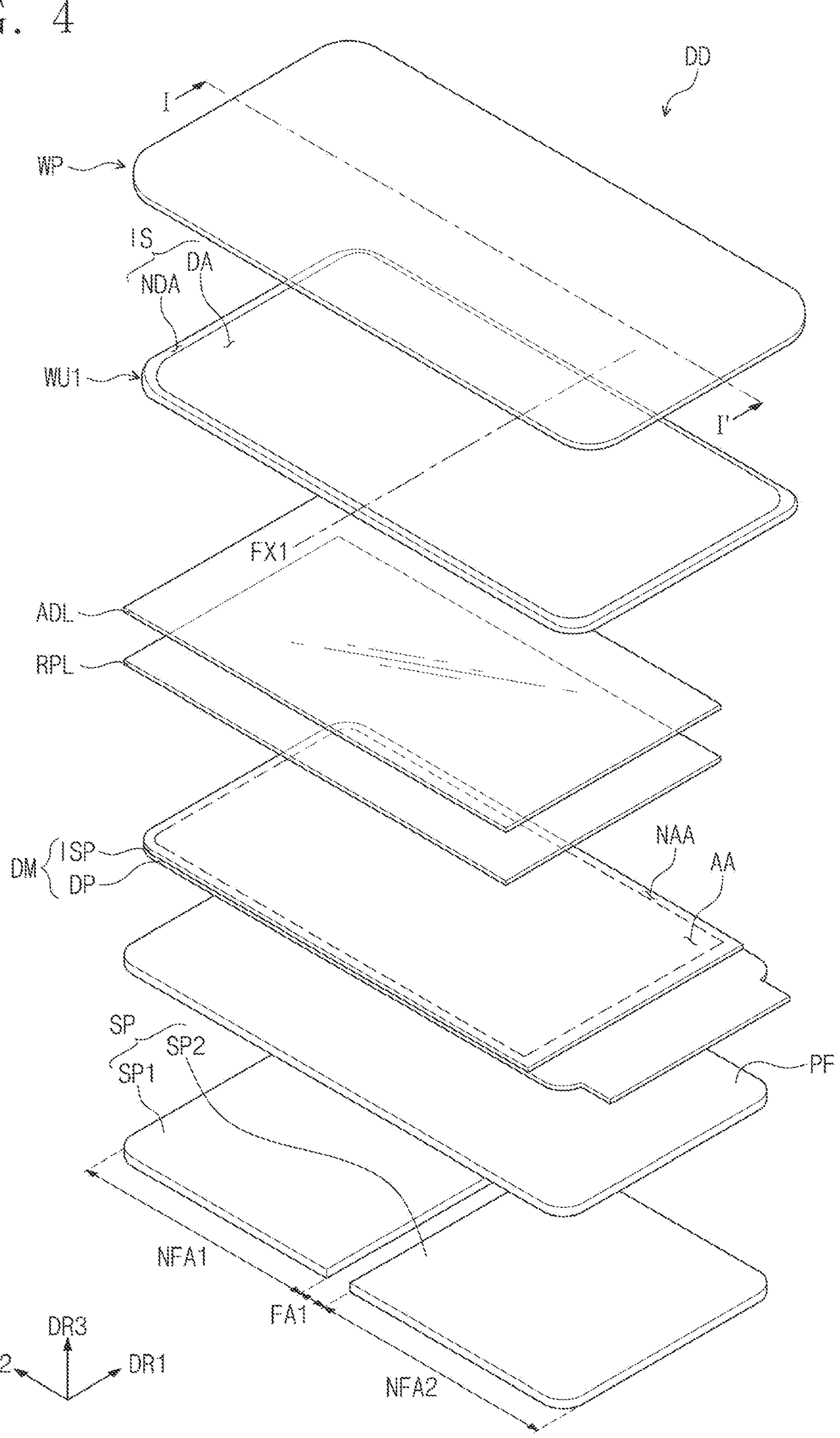
FIG. 4 is an exploded perspective view of a display device according to one or more embodiments of the present disclosure.

FIG. 4 is an exploded perspective view of the display device DD according to one or more embodiments of the present disclosure. FIG. 5 is a cross-sectional view of the display device according to one or more embodiments of the present disclosure. FIG. 5 shows a cross-section taken along the line I-I' shown in FIG. 4.

Referring to FIGS. 4 and 5, the display device DD may include a display module DM for displaying the image, a first window (e.g., a first window unit) WU1 located on the display module DM, and a protective member WP located on the first window WU1. The display module DM may serve as a component of the display device DD (refer to FIG. 1) and may generate the image.

The display module DM may include a display panel DP and an input sensor (e.g., an input-sensing unit) ISP. The display panel DP may be a light-emitting type of display panel, however, the display panel DP should not be particularly limited. For instance, the display panel DP may be an organic light-emitting display panel or a quantum dot light-emitting display panel. A light-emitting layer of the organic light-emitting display panel may include an organic light-emitting material. A light-emitting layer of the quantum dot light-emitting display panel may include a quantum dot or a quantum rod. Hereinafter, the organic light-emitting display panel will be described as an example of the display panel DP.

The display panel DP may be a flexible display panel. Accordingly, the display panel DP may be entirely rolled or may be folded or unfolded about the folding axis FX1.

The input sensor ISP may be located directly on the display panel DP. According to one or more embodiments, the input sensor ISP may be formed on the display panel DP through successive processes. When the input sensor ISP is located directly on the display panel DP, an adhesive film may be omitted from between the input sensor ISP and the display panel DP, however, the present disclosure should not be limited thereto or thereby. According to one or more embodiments, the adhesive film may be located between the input sensor ISP and the display panel DP, which are provided in a panel form. In this case, the input sensor ISP may not be manufactured together with the display panel DP through the successive processes. That is, the input sensor ISP may be fixed to an upper surface of the display panel DP by the adhesive film after being manufactured through a separate process from the display panel DP.

The display panel DP may generate the image, and the input sensor ISP may obtain coordinate information about the user input (e.g., a touch event).

The first window WU1 may be located on the display module DM. The first window WU1 may include an optically transparent insulating material. Therefore, the user may easily perceive the image generated by the display module DM through the first window WU1.

The first window WU1 may include a transparent material. The first window WU1 may include a glass, tempered glass, or synthetic resin film. The first window WU1 may be a glass substrate that is chemically tempered. In the case where the first window WU1 is the chemically tempered glass substrate, the first window WU1 may have a high mechanical strength while having a thin thickness, and thus, the first window WU1 may be used as a window of a foldable display device. In the case where the first window WU1 includes the synthetic resin film, the first window WU1 may include a polyimide (PI) film or a polyethylene terephthalate (PET) film. The first window WU1 may include a flexible material. Accordingly, the first window WU1 may be folded or unfolded with respect to the folding axis FX1. That is, a shape of the first window WU1 may be changed together when a shape of the display module DM is changed.

The first window WU1 may have a thickness equal to or greater than about and/or equal to or less than about 60 μm. For example, the thickness of the first window WU1 may be equal to or greater than about 20 μm and/or equal to or less than about 40 μm. The first window WU1 may have a shape in which an edge of the first window WU1 is rounded. In more detail, the first window WU1 may have a shape in which an edge of an upper surface of the first window WU1, which overlaps the non-display area NDA, is rounded. The first window WU1 may include the glass, tempered glass, or synthetic resin film as its base layer. The first window WU1 may further include functional layers located on an upper surface and/or a lower surface of the base layer. The first window WU1 may transmit the image from the display module DM, and may substantially simultaneously buffer external impacts to reduce or prevent the likelihood of the display module DM being damaged or malfunctioning due to the external impacts. The external impacts indicate an external force, such as pressure or stress, which may cause defects in the display module DM.

The protective member WP may be located on the first window WU1. The protective member WP may improve an impact resistance of the first window WU1, and may reduce or prevent the likelihood of the first window WU1 shattering when damaged. The protective member WP may include at least one of a urethane-based resin, an epoxy-based resin, a polyester-based resin, a polyether-based resin, an acrylate-based resin, an acrylonitrile-butadiene-styrene (ABS) resin, and a rubber. As an example, the protective member WP may include at least one of phenylene, polyethylene terephthalate (PET), polyimide (PI), polyamide (PA), polyethylene naphthalate (PEN), and polycarbonate (PC).

One or more functional layers may be located between the display panel DP and the first window WU1. As an example, the functional layer may be an anti-reflective layer RPL that blocks the reflection of an external light. The anti-reflective layer RPL may reduce or prevent perceivability of components in the display panel DP from the outside due to the external light incident through the front surface of the display device DD. The anti-reflective layer RPL may include a retarder and a polarizer. The retarder may be a film type or liquid crystal coating type, and may include a $\lambda/2$ retarder and/or a $\lambda/4$ retarder. The polarizer may be a film type or liquid crystal coating type. The film type retarder and polarizer may include a stretching type of synthetic resin film, and the liquid crystal coating type of retarder and polarizer may include liquid crystals aligned in an alignment (e.g., a set or predetermined alignment). The retarder and the polarizer may be implemented as one polarizing film.

The anti-reflective layer RPL may include color filters. The color filters may be arranged in an alignment (e.g., a set or predetermined arrangement). The arrangement of the color filters may be determined by considering colors of lights emitted from pixels included in the display panel DP. In addition, the anti-reflective layer RPL may further include a black matrix adjacent to the color filters.

According to one or more embodiments, the anti-reflective layer RPL may include a destructive interference structure. For instance, the destructive interference structure may include a first reflection layer and a second reflection layer, which are located on different layers from each other. A first reflection light and a second reflection light, which are respectively reflected by the first reflection layer and the second reflection layer, may be destructively interfered, and thus, the anti-reflective layer RPL may reduce the reflectance with respect to the external light.

The functional layer may further include a protective film located on or under the anti-reflective layer RPL.

The anti-reflective layer RPL may be located on the input sensor ISP. That is, the anti-reflective layer RPL may be located between the input sensor ISP and the first window WU1. The anti-reflective layer RPL and the first window WU1 may be coupled to each other by an adhesive film ADL. In one or more embodiments, an adhesive film that fixes the anti-reflective layer RPL to the input sensor ISP may be further located between the input sensor ISP and the anti-reflective layer RPL. Different from the structure shown in FIG. 4, the input sensor ISP may be provided in the panel form separated from the display panel DP, and the anti-reflective layer RPL may be located between the input sensor ISP and the display panel DP.

As an example, the adhesive film ADL may be an optically clear adhesive (OCA) film. However, the adhesive film ADL should not be limited thereto or thereby, and may include a conventional adhesive. For example, the adhesive film ADL may include an optically clear resin (OCR) or a pressure sensitive adhesive film (PSA).

The display panel DP may display the image in response to electrical signals, and may transmit/receive information about the external input. The display panel DP may include an active area AA and a peripheral area NAA. The active area AA may be defined as an area through which the image provided from the display module DM is transmitted.

The peripheral area NAA may be defined adjacent to the active area AA. For example, the peripheral area NAA may surround the active area AA. However, this is merely an example, and the peripheral area NAA may be defined in various shapes and should not be particularly limited. According to one or more embodiments, the active area AA of the display panel DP may correspond to at least a portion of the display area DA.

As shown in FIGS. 4 and 5, the display device DD may further include a protective film PF that is located on the rear surface of the display panel DP and that protects the display panel DP, and a support plate SP that is located on the rear surface of the display panel DP and that supports the display module DM. The support plate SP may be a metal plate. The support plate SP may be a stainless-steel plate. The support plate SP may have a strength that is greater than a strength of the display module DM.

The number of support plates SP may correspond to the number of non-folding areas NFA1 and NFA2. As an example, the support plate SP may include a first support plate SP1, and a second support plate SP2 spaced apart from the first support plate SP1. The first and second support plates SP1 and SP2 may be located to respectively correspond to the non-folding areas NFA1 and NFA2. That is, the first support plate SP1 may be located to correspond to the first non-folding area NFA1 of the display device DD, and the second support plate SP2 may be located to correspond to the second non-folding area NFA2 of the display device DD. The display device DD may be folded about the first folding axis FX1, and the first and second support plates SP1 and SP2 may be spaced apart from each other in the second direction when the display device is in the non-folded state.

The first and second support plates SP1 and SP2 may be spaced apart from each other in the folding area FA1. The first and second support plates SP1 and SP2 may overlap a portion of the folding area FA1, and may not overlap at least a portion of the folding area FA1. That is, a distance between the first and second support plates SP1 and SP2 in the second direction DR2 may be less than a width of the folding area FA1.

The support plate SP may further include a connection module to connect the first and second support plates SP1 and SP2. The connection module may include a hinge module or a multi-joint module.

In one or more embodiments, the support plate SP includes two support plates SP1 and SP2, however, the number of the support plates should not be limited to two. That is, when the number of the folding axes FX1 and the number of the folding areas FA1 increase, the support plate SP may include a plurality of support plates separated from each other with respect to plural folding axes FX1.

FIG. 4 shows a structure in which the support plate SP is divided into the first and second support plates SP1 and SP2, however, the present disclosure should not be limited thereto or thereby. That is, the support plate SP may be formed in a single-plate shape to be located to correspond to the folding area FA1 and the first and second non-folding areas NFA1 and NFA2. In this case, the support plate SP may be provided with a plurality of holes defined therethrough in the folding area FA1, or may include a material with relatively high flexibility in an area overlapping the folding area FA1.

The protective film PF may be further located between the display panel DP and the support plate SP. The protective film PF may include a polymer material. The protective film PF may serve as a layer that absorbs external impacts applied to the display panel DP. According to one or more embodiments, the protective film PF may be a cushion layer with high porosity. The protective film PF may be coupled with each of the display module DM and the support plate SP by an adhesive film.

As shown in FIG. 5, a sidewall of the first window WU1 may protrude more than a sidewall of each of the adhesive film ADL, the anti-reflective layer RPL, the input sensor ISP, and the display panel DP, which are located under the first window WU1, and thus, the first window WU1 may block the external impact from being transmitted to a lower structure.

Hereinafter, a method of manufacturing the display device will be described with reference to FIGS. 6A to 6D, 7A to 7F, 8A, and 8B.

FIGS. 6A to 6D are flowcharts of the method of manufacturing the display device according to one or more embodiments of the present disclosure.

Figure 6A:
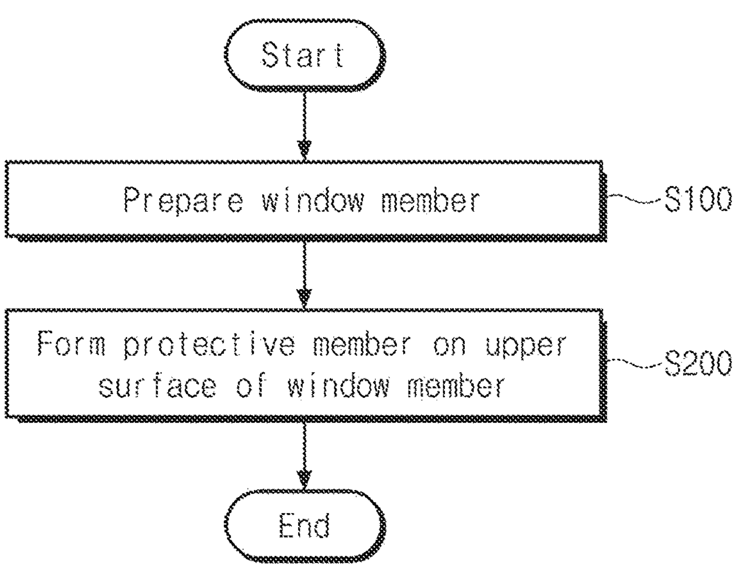
FIGS. 6A to 6D are flowcharts of a method of manufacturing a display device according to one or more embodiments of the present disclosure.

Referring to FIG. 6A, the manufacturing method of the display device may include preparing a window member WM (S100) and forming the protective member WP on an upper surface of the window member WM (S200).

Figure 6B:
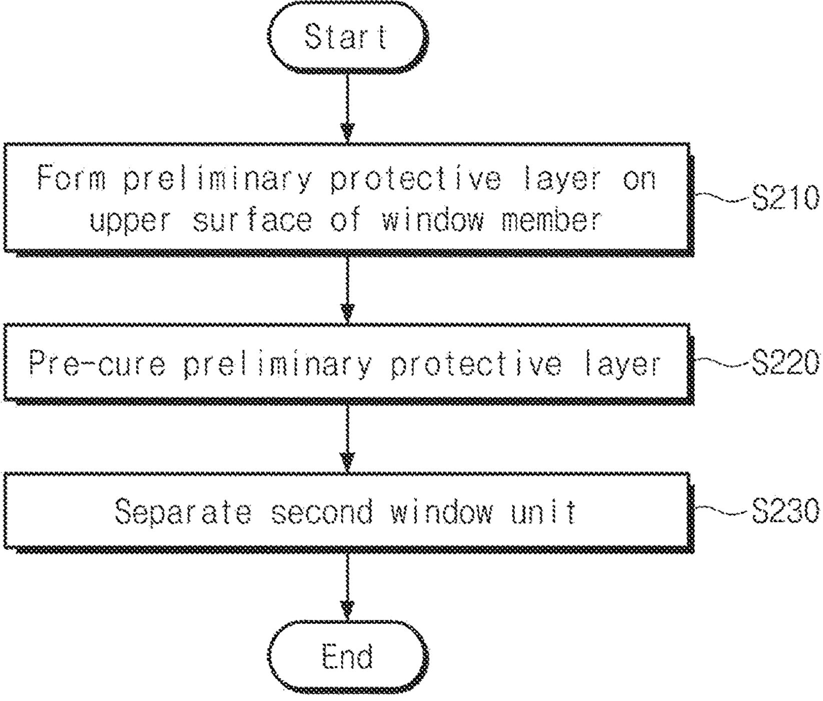

Referring to FIG. 6B, the forming of the protective member WP on the upper surface of the window member WM (S200) may include forming a preliminary protective layer WC on the upper surface of the window member WM (S210), pre-curing the preliminary protective layer WC (S220), and separating a second window (e.g., a second window unit) WU2 from the first side surface SS1(S230).

Figure 6C:
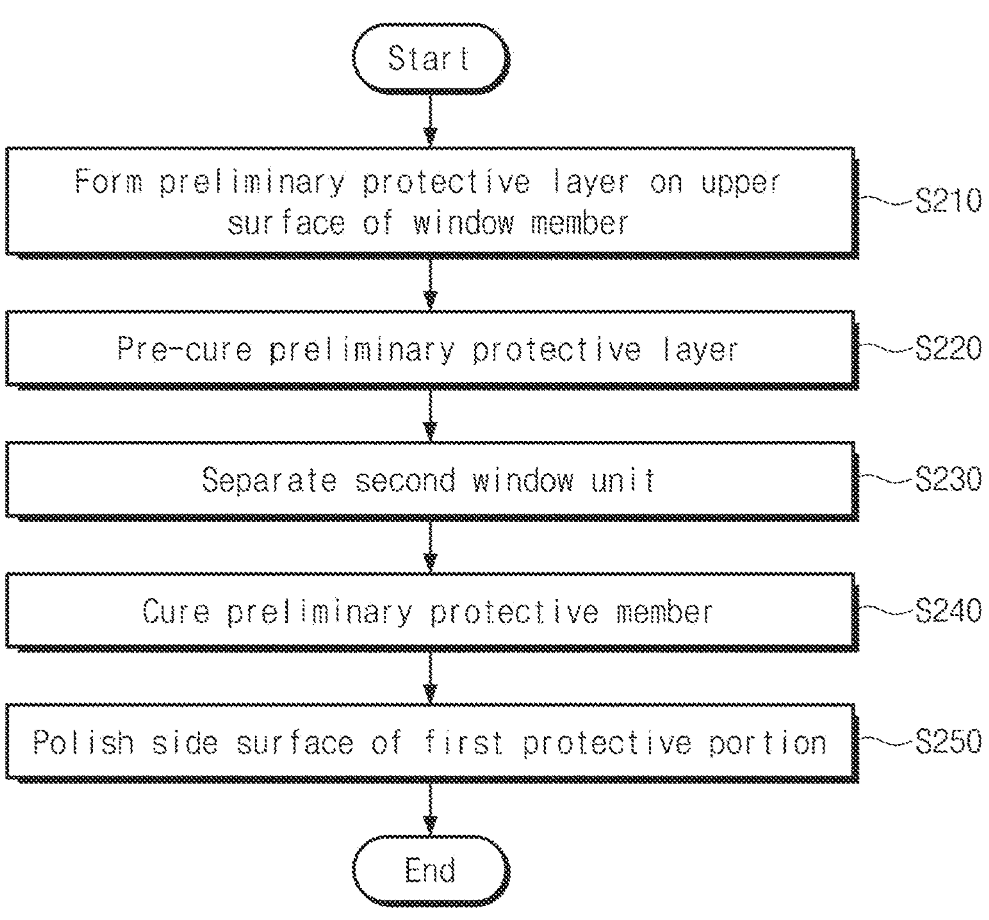

Referring to FIG. 6C, the forming of the protective member WP on the upper surface of the window member WM (S200) may further include curing a preliminary protective member WPM (S240), and polishing a side surface of a first protective portion WPL1 (S250) after the above-mentioned operations S210 to S230.

Figure 6D:
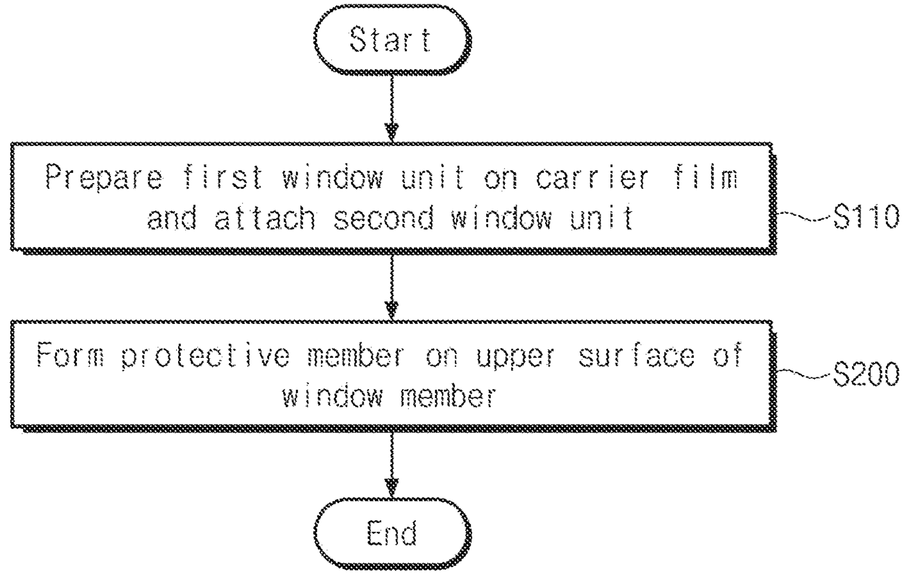

Referring to FIG. 6D, according to one or more embodiments of the present disclosure, the manufacturing method of the display device may include preparing the first window WU1 on a carrier film CF and attaching the second window WU2 to the first window WU1 (S110), and forming the protective member WP on the upper surface of the window member WM (S200).

Figure 7A:
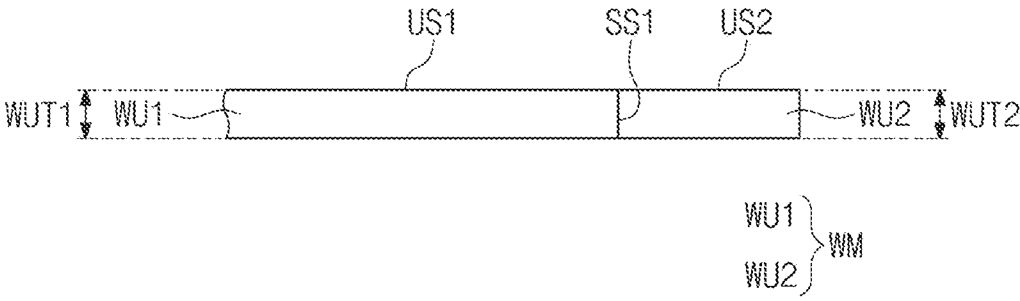
FIGS. 7A to 7F are cross-sectional views of a method of manufacturing a window according to one or more embodiments of the present disclosure.
Figure 7B:
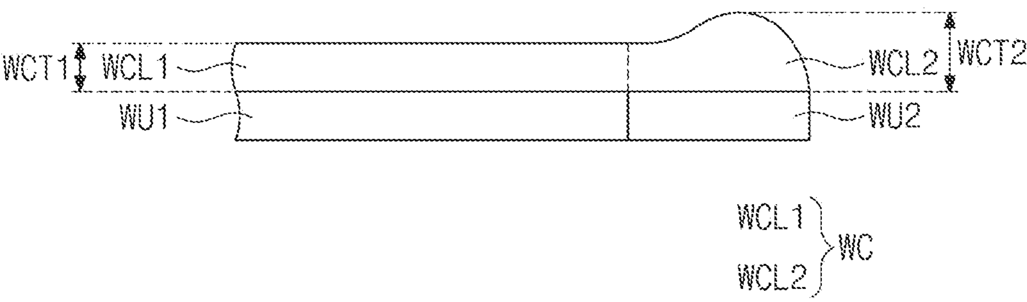
Figure 7C:
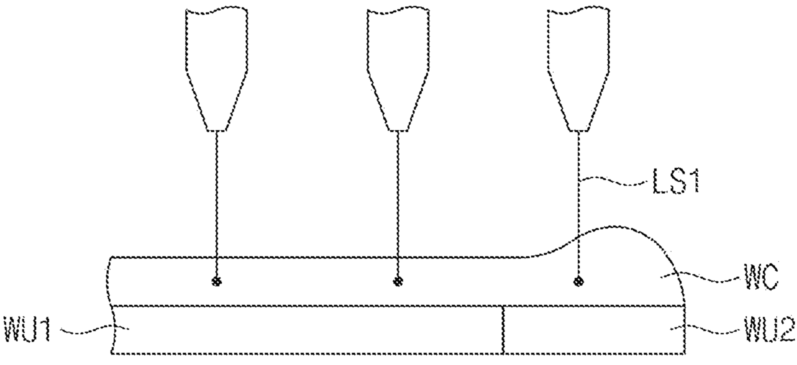
Figure 7D:
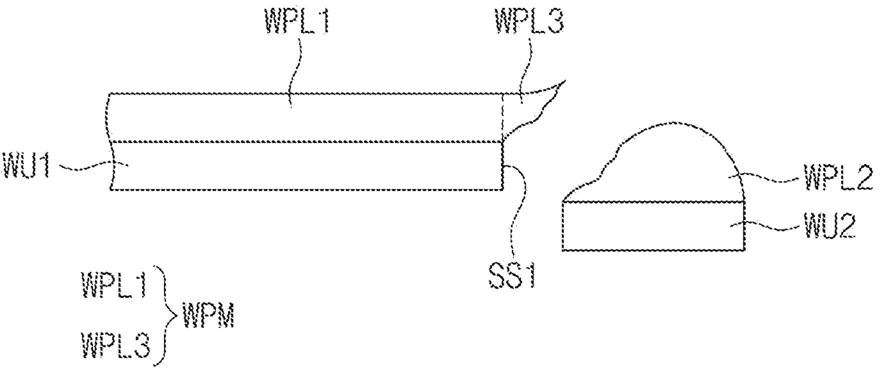
Figure 7E:
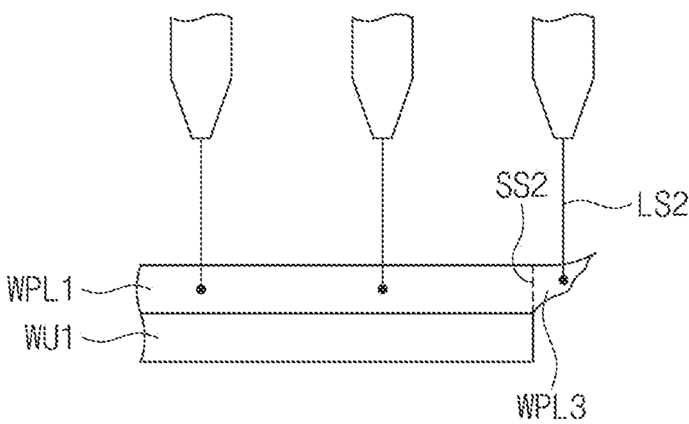
Figure 7F:
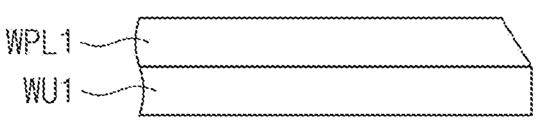
Figure 8A:
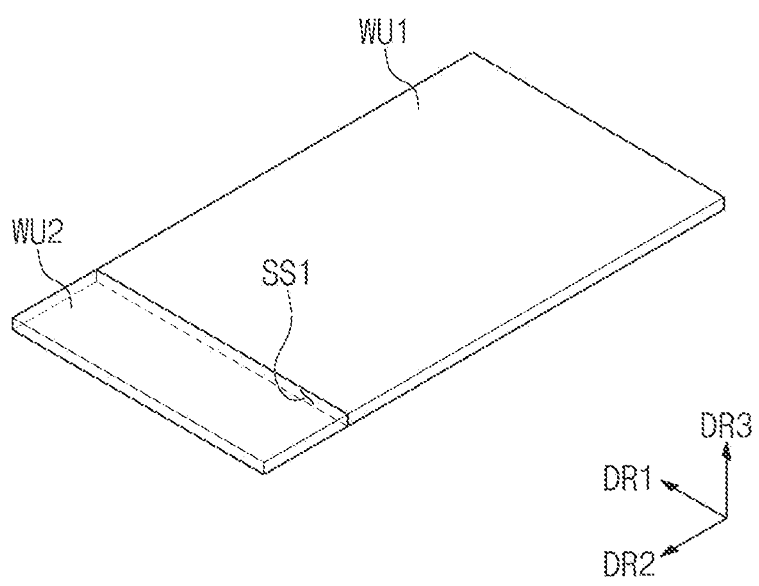
FIGS. 8A and 8B are perspective views of a process of preparing a window member of the manufacturing method of the window according to one or more embodiments of the present disclosure.
Figure 8B:
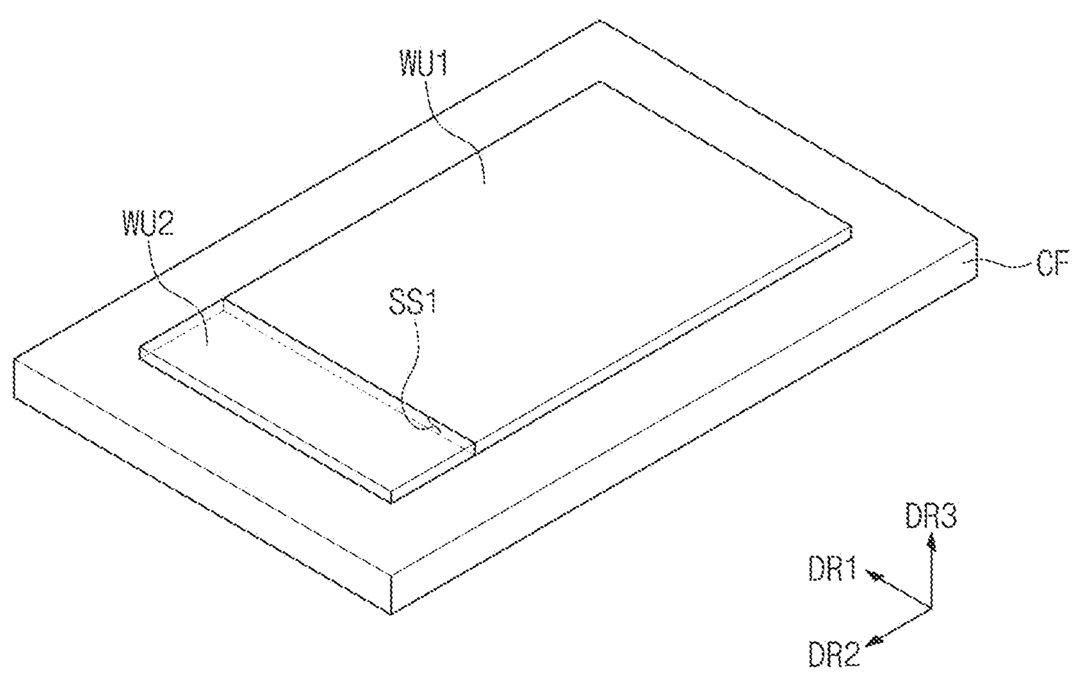

FIGS. 7A to 7F are cross-sectional views of the manufacturing method of the display device according to one or more embodiments of the present disclosure, and FIGS. 8A and 8B are perspective views of a process of preparing the window member of the manufacturing method of the window according to one or more embodiments of the present disclosure.

Referring to FIGS. 7A, 8A, and 8B, the manufacturing method of the display device may include the preparing of the window member WM. The window member WM may include the first window WU1 and the second window WU2.

The first window WU1 and the second window WU2 may be members that are separated from each other. That is, the first window WU1 and the second window WU2 may not be provided integrally with each other. In the preparing of the window member WM, the first window WU1 and the second window WU2 may be located adjacent to each other. A first side surface SS1 of the first window WU1 and a side surface of the second window WU2 may be located adjacent to each other. The first side surface SS1 of the first window WU1 may be in contact with the side surface of the second window WU2. FIG. 7A shows a structure in which one second window WU2 is located adjacent to the first side surface SS1 of the first window WU1 as an example, however, it should not be limited thereto or thereby. According to one or more embodiments, plural second windows may be located respectively adjacent to side surfaces of the first window WU1, which are opposite to each other.

The first window WU1 may include the display area DA (refer to FIG. 4). In one or more embodiments, the first window WU1 may include a transmission area. The transmission area may correspond to the display area, and the light or image may transmit through the transmission area.

The second window WU2 may have a width equal to or greater than about 1 mm and/or equal to or less than about 8 mm in a direction away from the first side surface SS1. Accordingly, the separating of the second window WU2 may be easily performed, and a manufacturing cost may be reduced. The second window WU2 may include the glass, tempered glass, chemically tempered glass, polyimide (PI) film, or polyethylene terephthalate (PET) film, however, it should not be limited thereto or thereby.

The second window WU2 may have a hardness that is different from a hardness of the first window WU1. After the separating of the second window WU2, the second window WU2 is not used in the manufacturing method of the display device, and thus, the hardness of the second window WU2 may be less than the hardness of the first window WU1. The first window WU1 may have a thickness WUT1 that is the same as a thickness WUT2 of the second window WU2. Meanwhile, in the present disclosure, the expression "a thickness, a material, or a concentration of one component is substantially the same as that of another component" not only means a case that the components have exactly the same thicknesses, materials, or concentrations as each other, but also means a case that the thicknesses, materials, or concentrations of the components are the same as each other within a range including differences that may occur due to fabrication errors in spite of the same design. As the thickness WUT1 of the first window is substantially the same as the thickness WUT2 of the second window, the preliminary protective layer WC (refer to FIG. 7B) may have uniform thickness when the preliminary protective layer WC is formed on a first upper surface US1 and a second upper surface US2.

Referring to FIG. 8B, the preparing of the window member WM may include the preparing of the first window WU1 on the carrier film CF. The preparing of the window member WM may include the preparing of the first window WU1 on the carrier film CF and attaching the second window WU2 to the first window WU1. The carrier film CF may be used to transfer the window member WM. The carrier film CF may protect a lower portion of each of the first window WU1 and the second window WU2.

Referring to FIG. 7B, the manufacturing method of the display device may include the forming of the preliminary protective layer WC on the upper surface of the window member WM. The preliminary protective layer WC may include a first protective layer WCL1 located on the first upper surface US1, and a second protective layer WCL2 located on the second upper surface US2. The manufacturing method of the display device may include the forming of the preliminary protective layer WC on the first upper surface US1 of the first window WU1 and on the second upper surface US2 of the second window WU2. The preliminary protective layer WC may be formed on the upper surface of the window member WM by a coating process. As an example, the preliminary protective layer WC may be formed by the coating process, such as an inkjet printing process. Meanwhile, the first protective layer WCL1 located on the first upper surface US1, and the second protective layer WCL2 located on the second upper surface US2, may be provided integrally with each other without being separated from each other.

The preliminary protective layer WC may include at least one of triacetyl cellulose (TAC), phenylene, polymethylmethacrylate(PMMA), polyethyleneterephthalate (PET), polyimide (PI), polyamide (PA), polyethylene naphthalate (PEN), and polycarbonate (PC).

After the forming of the preliminary protective layer WC, a second thickness WCT2 of the second protective layer WCL2 may be greater than a first thickness WCT1 of the first protective layer WCL1. Because the second window WU2 is located at an outer portion of the window member WM, the second thickness WCT2 of the second protective layer WCL2 may be greater than the first thickness WCT1 of the first protective layer WCL1 due to a surface tension of the coating solution after the coating process. In more detail, a thickness of the thickest portion of the second protective layer WCL2 may be greater than the first thickness WCT1 of the first protective layer WCL1.

Referring to FIG. 7C, the manufacturing method of the display device may include the pre-curing of the preliminary protective layer WC. The pre-curing of the preliminary protective layer WC may include light-curing the preliminary protective layer WC using a first light LS1. The first light LS1 may be an ultraviolet light. The ultraviolet light used during the light-curing may be a complex light having a wavelength of about 350 nm to about 450 nm. After the pre-curing of the preliminary protective layer WC, an adhesion force of the preliminary protective layer WC with respect to the upper surface of the window member WM may be different depending on a time of the pre-curing operation, a type of initiator, or a wavelength of light.

Referring to FIG. 7D, the manufacturing method of the display device may include the separating of the second window WU2 from the first window WU1. The second window WU2 may be separated from the first side surface SS1 of the first window WU1. In one or more embodiments, the second window WU2 may be attached to the carrier film CF (refer to FIG. 8B) and may be separated from the first window WU1 together with the carrier film CF (refer to FIG. 8B).

In the separating of the second window WU2, the preliminary protective layer WC may be divided into a second protective portion WPL2 located on the second upper surface US2, and the preliminary protective member WPM having at least a portion on the first upper surface US1. The preliminary protective member WPM may include the first protective portion WPL1 and a third protective portion WPL3. The preliminary protective member WPM may include the first protective portion WPL1 located on the first upper surface US1, and the third protective portion WPL3 that is adjacent to the first protective portion WPL1 and that does not overlap the first upper surface US1. There might be no member placed on a lower surface of the third protective portion WPL3. When the second window WU2 is separated, the second protective portion WPL2 may be removed from the preliminary protective member WPM. When the second window WU2 is separated, the second protective layer WCL2 (refer to FIG. 7B) may be divided into the second protective portion WPL2 remaining on the second upper surface US2, and the third protective portion WPL3 connected to the side surface of the first protective portion WPL1. That is, the third protective portion WPL3 may be a portion of the second protective layer WCL2 (refer to FIG. 7B), which is not separated along with the second window WU2, but instead remains on the side surface of the first protective portion WPL1 when the second window WU2 is separated. The width of the third protective portion WPL3 in a direction away from the first protective portion WPL1 may be different depending on the time of the pre-curing process, the type of initiator, viscosity, or the wavelength of light.

After the separating of the second window WU2, the thickness of the first protective portion WPL1 may be uniform. Different from the second protective portion WPL2, the first protective portion WPL1 is not affected by the surface tension of the coating solution, and thus, the thickness of the first protective portion WPL1 may be uniform. That is, a thickness of an edge of the first protective portion WPL1, which is adjacent to the third protective portion WPL3, may be substantially the same as a thickness of a center portion of the first protective portion WPL1, which is spaced apart from the third protective portion WPL3. In detail, the thickness of the first protective portion WPL1 may be constant within an area from a boundary between the first window WU1 and the second window WU2 to a position spaced apart from the boundary by about 1 mm to about 8 mm.

Because the second window WU2 is used for the purpose of removing the preliminary protective layer WC area with non-uniform thickness, the second window WU2 may be removed after being separated from the first window WU1, and may be omitted from the display device manufactured by the manufacturing method of the display device. The second window WU2 might not be located in the display device DD (refer to FIG. 4).

Referring to FIG. 7E, the manufacturing method of the display device may include the curing of the preliminary protective member WPM. The curing of the preliminary protective member WPM may include light-curing the preliminary protective member WPM using a second light LS2. The second light LS2 may be an ultraviolet light. The ultraviolet light used for the light-curing may have a wavelength from about 350 nm to about 450 nm. After the curing of the preliminary protective member WPM, the thickness of the first protective portion WPL1 may be equal to or greater than about and/or equal to or less than about 80 μm.

Referring to FIGS. 7E and 7F, the manufacturing method of the display device may include the polishing of a second side surface SS2 of the first protective portion WPL1. In a case where the third protective portion WPL3 is present, the manufacturing method of the display device may further include removing the third protective portion WPL3 from the second side surface SS2 of the first protective portion WPL1 or polishing the third protective portion WPL3. The polishing process may be performed by an edge bead removal (EBR) process. As an example, the polishing process may be performed by showering the third protective portion WPL3 or the second side surface SS2 of the first protective portion WPL1 using the cleaning solution to remove an edge bead of a photoresist. After the polishing process, polishing marks may remain on the first protective portion WPL1.

Because the third protective portion WPL3 is removed without causing physical impact to the first window WU1 in the polishing process, the polishing process does not cause a reduction in the hardness of the first side surface SS1 of the first window WU1. Accordingly, the hardness of the side surface SS1 of the first window WU1 before the polishing process may be substantially the same as the hardness of the side surface SS1 of the first window WU1 after the polishing process. Accordingly, an additional process to increase the hardness of the window is unnecessary, and thus, a process efficiency may be improved.

According to a conventional display device, a window protective member is formed on an upper surface of a window using a process of coating a coating solution and a UV-curing/light-curing process to improve an impact resistance of the window. However, because the coating solution is a liquid, a step difference may occur between a portion of a protective member located at an edge of the window, and a portion of the protective member located at a center of the window, due to a surface tension of the coating solution. That is, a thickness of the protective member located at the edge of the window may become greater than the thickness of the protective member located at the center of the window and may become non-uniform. Further, a camera of the display device may be located at an edge of the display device, and thus, the non-uniform thickness of the protective member located at the edge of the window may degrade a resolution of a camera.

According to the present disclosure, to reduce the non-uniformity in thickness of the protective member at the edge of the window, the protective member may be formed so that the portion of the protective member having the non-uniform thickness may not be included in the display area. In detail, as the protective member is formed on the second window that is added to the edge of the window in the display area, the non-uniform area due to the surface tension may be positioned on the second window. Then, the window protective member may be pre-cured, the second window and the protective member on the second window may be removed, and thus, the non-uniformity in the thickness of the protective member may be reduced. That is, according to using the second window serving as a dummy window, the non-uniformity in the thickness of the protective member may be reduced.

In addition, as the present disclosure employs the second window that is a separated dummy window instead of an extended integrated window, damage to the window and the window protective member may be reduced or prevented, and the process efficiency may be improved. In the case where the extended integrated window is employed, the extended integrated window with a size that is greater than the display area is prepared, the protective member is formed to allow the portion having the non-uniform thickness to be located on the extended portion of the window, and the portion having the non-uniform thickness is cut. In this case, the extended portion of the window and the protective member located thereon may be cut using a high-intensity laser irradiation process or an etching process. Because impacts are applied to the window and the protective member during the cutting process, the window protective member may be damaged, and the strength of the window may be lowered. In addition, to solve the reduction in strength of the cut side surface of the window, additional processes and cleaning processes may be suitable, thereby causing a difference in process efficiency when compared with the present disclosure. Accordingly, when the display device is manufactured by the manufacturing method according to the present disclosure, the non-uniformity in thickness of the protective member at the edge of the window due to the surface tension may be reduced or prevented without damaging the window and the protective member, and thus, the degradation of the resolution of the camera may be reduced or prevented.

Although the embodiments of the present disclosure have been described, it is understood that the present disclosure should not be limited to these embodiments, but various changes and modifications can be made by one ordinary skilled in the art within the spirit and scope of the present disclosure as hereinafter claimed. Therefore, the disclosed subject matter should not be limited to any single embodiment described herein, and the scope of the present disclosure shall be determined according to the attached claims.

What is claimed is:

1. A method of manufacturing a display device, the method comprising:

preparing a window member comprising a first window comprising a display area, and a second window adjacent to a first side surface of the first window;

forming a protective member on an upper surface of the window member by:

forming a preliminary protective layer comprising a first protective layer having a first thickness on a first upper surface of the first window and a second protective layer having a second thickness on a second upper surface of the second window, the second thickness being greater than the first thickness; and pre-curing the preliminary protective layer; and separating the second window from the first side surface, wherein during the separating of the second window from the first side surface, at least a portion of the second protective layer is removed together with the second window.

2. The method of claim 1, wherein the first window has a thickness that is substantially equal to a thickness of the second window.

3. The method of claim 1, wherein the first window has a hardness that is different from a hardness of the second window.

4. The method of claim 1, wherein the second window has a width between about 1 mm and about 8 mm in a direction away from the first side surface.

5. The method of claim 1, wherein the window member comprises a chemically tempered glass substrate.

6. The method of claim 1, wherein the pre-curing of the preliminary protective layer comprises light-curing the preliminary protective layer by a first light.

7. The method of claim 1, wherein the preliminary protective layer comprises polyimide, polycarbonate, polyamide, triacetyl cellulose, polymethylmethacrylate, or polyethylene terephthalate.

8. The method of claim 1, wherein the separating of the second window from the first side surface comprises removing a second protective portion on the second upper surface from a first protective portion on the first upper surface.

9. A method of manufacturing a display device, the method comprising:

preparing a window member comprising a first window comprising a display area, and a second window adjacent to a first side surface of the first window;

forming a protective member on an upper surface of the window member by:

forming a preliminary protective layer on a first upper surface of the first window and on a second upper surface of the second window; and pre-curing the preliminary protective layer; and separating the second window from the first side surface by:

removing a second protective portion on the second upper surface from a first protective portion on the first upper surface; and forming a third protective portion that is adjacent to the first protective portion and that does not overlap the first upper surface.

10. The method of claim 9, further comprising curing a preliminary protective member comprising the first protective portion and the third protective portion.

11. The method of claim 10, wherein the curing of the preliminary protective member comprises light-curing the preliminary protective member by a light.

12. The method of claim 10, wherein the first protective portion has a thickness that is equal to or greater than about 10 μm and that is equal to or less than about 80 μm after the curing of the preliminary protective member.

13. The method of claim 10, further comprising polishing a second side surface of the first protective portion.

14. The method of claim 13, wherein a hardness of the first side surface after the polishing of the second side surface is substantially equal to a hardness of the first side surface in the preparing of the window member.

15. The method of claim 10, further comprising polishing the third protective portion.

* * * * *